United States Patent
Ahmed et al.

(10) Patent No.: US 12,453,960 B1
(45) Date of Patent: Oct. 28, 2025

(54) NANOCOMPOSITE MATERIAL FABRICATION

(71) Applicant: IMAM MOHAMMAD IBN SAUD ISLAMIC UNIVERSITY, Riyadh (SA)

(72) Inventors: Ehab Abdelhamed Abdelrahman Ahmed, Riyadh (SA); Babiker Yagoub Elhadi Abdulkhair, Riyadh (SA)

(73) Assignee: IMAM MOHAMMAD IBN SAUD ISLAMIC UNIVERISTY, Riyadh (SA)

( * ) Notice: Subject to any disclaimer, the term of this patent is extended or adjusted under 35 U.S.C. 154(b) by 0 days.

(21) Appl. No.: 19/072,950

(22) Filed: Mar. 6, 2025

(51) Int. Cl.
| | |
|---|---|
| *B01J 23/06* | (2006.01) |
| *B01J 20/04* | (2006.01) |
| *B01J 20/06* | (2006.01) |
| *B01J 20/28* | (2006.01) |
| *B01J 20/30* | (2006.01) |
| *B01J 21/06* | (2006.01) |
| *B01J 21/18* | (2006.01) |

(Continued)

(52) U.S. Cl.
CPC ............ *B01J 23/06* (2013.01); *B01J 20/041* (2013.01); *B01J 20/06* (2013.01); *B01J 20/28004* (2013.01); *B01J 20/28007* (2013.01); *B01J 20/28019* (2013.01); *B01J 20/3078* (2013.01); *B01J 20/3085* (2013.01); *B01J 21/063* (2013.01); *B01J 21/18* (2013.01); *B01J 23/02* (2013.01); *B01J 35/39* (2024.01); *B01J 35/394* (2024.01); *B01J 35/40* (2024.01); *B01J 35/45* (2024.01); *B01J 35/51* (2024.01); *B01J 35/77* (2024.01); *B01J 37/04* (2013.01); *B01J 37/084* (2013.01); *C02F 1/288* (2013.01); *C02F 1/281* (2013.01); *C02F 2101/20* (2013.01); *C02F 2101/30* (2013.01)

(58) Field of Classification Search
CPC ...................................................... B01J 21/063
See application file for complete search history.

(56) References Cited

U.S. PATENT DOCUMENTS

2020/0316577 A1  10/2020  Jones et al.

FOREIGN PATENT DOCUMENTS

| CN | 112263999 A | 1/2021 |
| WO | 2023/113699 A2 | 6/2023 |

OTHER PUBLICATIONS

Gaurav K. Upadhyay et al., "Optimized CdO:TiO2 nanocomposites for heterojunction solar cell applications", Journal of Alloys and Compounds, vol. 856, Mar. 5, 2021, 157453, 8 pages.

*Primary Examiner* — Alexandre F Ferre
(74) *Attorney, Agent, or Firm* — Oblon, McClelland, Maier &Neustadt, L.L.P.

(57) ABSTRACT

A $Mg_{0.6}Ti_{2.4}O_5$/$MgTiO_3$/tetragonal $TiO_2$/orthorhombic $TiO_2$/CdO/C nanocomposite material includes an orthorhombic $Mg0.6Ti_{2.4}O_5$ phase; a hexagonal magnesium titanate ($MgTiO_3$) phase, a tetragonal titanium dioxide ($TiO_2$) phase, a cubic cadmium Oxide (CdO) phase, and an orthorhombic $TiO_2$ phase. The $Mg_{0.6}Ti_{2.4}O_5$/$MgTiO_3$/Tetragonal $TiO_2$/Orthorhombic $TiO_2$/CdO/C nanocomposite material has a granular morphology including spherical particles having an average particle diameter ranging from 50 nanometer (nm) to 130 nm. Furthermore, a method of production includes calcination of metal precursors.

20 Claims, 5 Drawing Sheets

(51) Int. Cl.
*B01J 23/02* (2006.01)
*B01J 35/30* (2024.01)
*B01J 35/39* (2024.01)
*B01J 35/40* (2024.01)
*B01J 35/45* (2024.01)
*B01J 35/51* (2024.01)
*B01J 35/77* (2024.01)
*B01J 37/04* (2006.01)
*B01J 37/08* (2006.01)
*C02F 1/28* (2023.01)
*C02F 101/20* (2006.01)
*C02F 101/30* (2006.01)

(12) United States Patent

NANOCOMPOSITE MATERIAL FABRICATION

BACKGROUND

Technical Field

The present disclosure is directed towards fabrication of nanocomposite materials, and more particularly, relates to a multiphase nanocomposite material and a method of preparation thereof.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

Multifunctional nanocomposite materials are of utmost importance for advanced industrial applications, including, but not limited to, catalysis, energy storage, and electronic devices. The nanocomposites incorporate a high surface area, tunable porosity, enhanced mechanical strength, and enhanced thermal and chemical stability, which render the nanocomposites desirable for the aforementioned applications. Further, an ability of the nanocomposites to exhibit enhanced electrical, optical, and catalytic properties due to controlled nanoscale interactions increases utility of the nanocomposites in high-performance technologies. The incorporation of multiple crystalline phases into a single nanocomposite enables synergistic effects that may improve mechanical durability, electronic conductivity, and chemical reactivity, making nanocomposites highly sought after in emerging material science applications.

Further, a plurality of studies have been conducted on titanium oxide-based and magnesium-titanium oxide nanocomposites due to their desirable photocatalytic, dielectric, and electrochemical properties. Various synthesis methods, including sol-gel, hydrothermal, solid-state, and co-precipitation techniques, have been employed to fabricate the nanocomposite materials with varying degrees of success. Researchers have attempted to modify the nanocomposites by doping with transition metals or introducing binary or ternary phase compositions to improve specific functionalities. Despite these advancements, existing materials often fail to achieve the necessary balance between phase stability, structural uniformity, and optimized porosity. Hence, several limitations exist in current nanocomposite technologies.

Many single-phase and binary-phase materials exhibit restricted functionality due to limited interfacial interactions between different components. Poor phase compatibility leads to heterogeneous microstructures, reducing overall performance in applications requiring precise crystallographic control. In addition, conventional fabrication techniques frequently involve energy-intensive processes, prolonged synthesis times, and high-cost precursors, making large-scale production impractical. The lack of uniform morphology and controlled crystallite size further contributes to inconsistencies in catalytic efficiency, electrical conductivity, and mechanical reliability of the nanocomposite structure. Therefore, a need arises for addressing phase instability, inconsistent morphology, and inefficient synthesis processes of nanocomposites.

Accordingly, one object of the present disclosure is to provide a multiphase nanocomposite material, and a method of synthesis thereof, that may circumvent the above listed drawbacks and limitations of the materials and methods already known in the art.

SUMMARY

In an exemplary embodiment, a $Mg_{0.6}Ti_{2.4}O_5/MgTiO_3/$ tetragonal $TiO_2$/orthorhombic $TiO_2$/CdO/C nanocomposite material includes an orthorhombic magnesium titanium oxide ($Mg_{0.6}Ti_{2.4}O_5$) phase, a hexagonal magnesium titanate ($MgTiO_3$) phase, a tetragonal titanium dioxide ($TiO_2$) phase, a cubic cadmium oxide (CdO) phase, and an orthorhombic titanium dioxide ($TiO_2$) phase. The $Mg_{0.6}Ti_{2.4}O_5/$ $MgTiO_3$/tetragonal $TiO_2$/orthorhombic $TiO_2$/CdO/C nanocomposite material has a granular morphology including spherical particles having an average particle diameter in a range from 50 nanometer (nm) to 130 nm.

In some embodiments, the spherical particles have an average particle diameter in a range from 70 nm to 110 nm.

In some embodiments, the spherical particles have an average particle diameter in a range from 80 nm to 100 nm.

In some embodiments, the $Mg_{0.6}Ti_{2.4}O_5/MgTiO_3$/tetragonal $TiO_2$/orthorhombic $TiO_2$/CdO/C nanocomposite material has an oxygen (O) content in a range from 50 atomic % (at. %) to 80 at. %, a titanium (Ti) content in a range from 10 at. % to 30 at. %, a magnesium (Mg) content in a range from 5 at. % to 15 at. %, a cadmium (Cd) content in a range from 1 at. % to 6 at. %, and a carbon (C) content in a range from 0.5 at. % to 5 at. % based on a total number of atoms in the $Mg_{0.6}Ti_{2.4}O_5/MgTiO_3$/Tetragonal $TiO_2$/Orthorhombic $TiO_2$/CdO/C nanocomposite material.

In some embodiments, the $Mg_{0.6}Ti_{2.4}O_5/MgTiO_3$/tetragonal $TiO_2$/orthorhombic $TiO_2$/CdO/C nanocomposite material has an oxygen content in a range from 55 at. % to 75 at. %, a titanium content in a range from 15 at. % to 25 at. %, a magnesium content in a range from 6 at. % to 13 at. %, a cadmium content in a range from 1.5 at. % to 5 at. %, and a carbon content in a range from 1 at. % to 4 at. % based on a total number of atoms in the $Mg_{0.6}Ti_{2.4}O_5/MgTiO_3$/tetragonal $TiO_2$/orthorhombic $TiO_2$/CdO/C nanocomposite material.

In some embodiments, the $Mg_{0.6}Ti_{2.4}O_5/MgTiO_3$/tetragonal $TiO_2$/orthorhombic $TiO_2$/CdO/C nanocomposite material has an oxygen content in a range from 60 at. % to 70 at. %, a titanium content in a range from 17 at. % to 24 at. %, a magnesium content in a range from 7 at. % to 12 at. %, a cadmium content in a range from 2 at. % to 3 at. %, and a carbon content in a range from 1.5 at. % to 3 at. % based on a total number of atoms in the $Mg_{0.6}Ti_{2.4}O_5/MgTiO_3$/tetragonal $TiO_2$/orthorhombic $TiO_2$/CdO/C nanocomposite material.

In some embodiments, the $Mg_{0.6}Ti_{2.4}O_5/MgTiO_3$/tetragonal $TiO_2$/orthorhombic $TiO_2$/CdO/C has an average crystallite size in a range from 40 nm to 80 nm.

In some embodiments, the $Mg_{0.6}Ti_{2.4}O_5/MgTiO_3$/tetragonal $TiO_2$/orthorhombic $TiO_2$/CdO/C has an average crystallite size in a range from 50 nm to 70 nm.

In some embodiments, the $Mg_{0.6}Ti_{2.4}O_5/MgTiO_3$/tetragonal $TiO_2$/orthorhombic $TiO_2$/CdO/C has an average crystallite size in a range from 55 nm to 65 nm.

In another exemplary embodiment, a method of producing the aforementioned orthorhombic $Mg_{0.6}Ti_{2.4}O_5/Mg$-$TiO_3$/tetragonal $TiO_2$/orthorhombic $TiO_2$/CdO/C nanocomposite material includes adding a first solution including titanium butoxide, ethanol, and acetic acid, stepwise, to a second solution including magnesium nitrate hexahydrate $Mg(NO_3)_2 \cdot 6H_2O$ and cadmium nitrate tetrahydrate $Cd(NO_3)_2 \cdot 4H_2O$ under stirring to form a reaction mixture. Further, the method includes adding a third solution including L-sorbose, stepwise to the reaction mixture under stirring at 200° C., stirring the reaction mixture at 200° C. until a solid is formed, and calcining the solid at a temperature in a range from 600° C. to 800° C. for 1 hour to 5 hours to yield the $Mg_{0.6}Ti_{2.4}O_5/MgTiO_3$/tetragonal $TiO_2$/orthorhombic $TiO_2$/CdO/C nanocomposite material.

In some embodiments, the concentration of titanium butoxide in the first solution is in a range from 100 milliliters per liter (ml/L) to 300 ml/L.

In some embodiments, the concentration of titanium butoxide in the first solution is 200 ml/L.

In some embodiments, the concentration of ethanol in the first solution is in a range from 100 ml/L to 300 ml/L.

In some embodiments, the concentration of $Mg(NO_3)_2 \cdot 6H_2O$ in the second solution is in a range from 80 grams per liter (g/L) to 100 g/L.

In some embodiments, the concentration of $Cd(NO_3)_2 \cdot 4H_2O$ in the second solution is in a range from 100 g/L to 125 g/L.

In some embodiments, the concentration of L-sorbose in the third solution is in a range from 50 g/L to 70 g/L.

In some embodiments, the solid is calcined at a temperature in a range from 650° C. to 750° C.

In some embodiments, the solid is calcined at 700° C.

In some embodiments, the solid is calcined for 2 hours to 4 hours.

In some embodiments, the solid is calcined for 3 hours.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
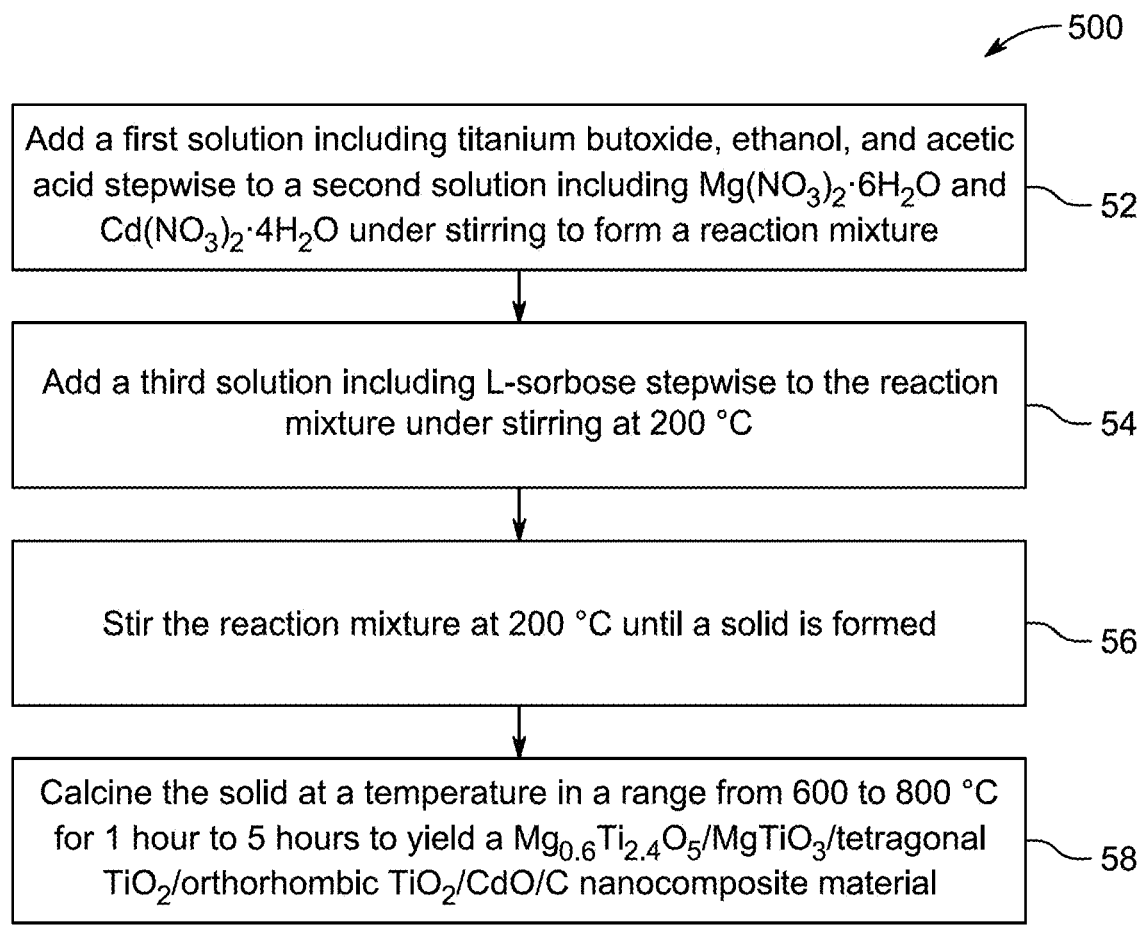
FIG. 1A illustrates an exemplary flow chart depicting a method for synthesizing a $Mg_{0.6}Ti_{2.4}O_5/MgTiO_3$/tetragonal $TiO_2$/orthorhombic $TiO_2$/CdO/C nanocomposite, according to certain embodiments.

When describing the present disclosure, the terms used are to be construed in accordance with the following definitions, unless a context dictates otherwise.

Embodiments of the present disclosure will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'nanoparticles (NPs)' refers to particles having a particle size of 1 nanometer (nm) to 500 nm within the scope of the present disclosure.

As used herein, the term 'nanocomposite' refers to a composite material that has at least one component with a grain size measured in nanometers.

As used herein, the term 'nanohybrid composite' refers to a material that combines nanomaterials (such as nanoparticles, nanotubes, or nanofibers) with another material, typically a polymer, metal, or ceramic, to form a composite structure. The nanomaterials are typically incorporated at the nanoscale level to enhance the properties of the base material, such as improving strength, conductivity, or flexibility, while maintaining the advantages of both components. The resulting nanohybrid composite exhibits unique properties that are enhanced to the individual materials alone.

As used herein, the term 'porosity' refers to a measure of the void or vacant spaces within a material.

As used herein, the term 'pore diameter' refers to an average width or size of the pores (void spaces) within a material, typically measured in nm or angstroms (Å). It is a parameter in characterizing the texture and permeability of porous materials, influencing their adsorption, filtration, or catalytic properties. The pore diameter is often determined using methods such as nitrogen adsorption or mercury intrusion, which provide insights into the material's ability to absorb or interact with molecules of specific sizes.

As used herein, the term 'pore volume' refers to the total volume of void spaces (pores) within a material that is capable of being filled by a gas or liquid. It is typically expressed in cubic centimeters per gram ($cm^3/g$) and is a parameter in characterizing the porous structure of materials, such as adsorbents or catalysts.

As used herein, the term 'average particle size' refers to the mean diameter of nanoparticles in a sample, typically calculated from measurements obtained using techniques such as scanning electron microscopy (SEM) or transmission electron microscopy (TEM), representing the typical size of the particles in the distribution.

As used herein, the term 'average crystallite size' refers to the mean size of crystalline regions in a material, typically determined through X-ray diffraction (XRD) analysis, and represents the size of the individual crystal domains within the sample, excluding any amorphous material.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include 13C and 14C. Isotopes of oxygen include 16O, 17O, and 18O. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

An aspect of the present disclosure is directed to a $Mg_{0.6}Ti_{2.4}O_5$/$MgTiO_3$/tetragonal $TiO_2$/orthorhombic $TiO_2$/CdO/C nanocomposite (also referred to as a nanocomposite material) fabricated via a sol-gel/combustion approach. The nanocomposite material fabricated by the method of present disclosure aims at achieving a multi-phase crystalline structure with enhanced morphological and functional properties for advanced industrial applications.

A nanocomposite material includes an orthorhombic $Mg_{0.6}Ti_{2.4}O_5$ phase, a hexagonal $MgTiO_3$ phase, a tetragonal $TiO_2$ phase, a cubic CdO phase, and an orthorhombic $TiO_2$ phase. In some embodiments, the nanocomposite material may include other crystalline phases, but is not limited to quartz, calcite, hematite, magnetite, goethite, dolomite, albite, anorthite, pyrite, fluorite, halite, barite, apatite, rutile, and zircon. In a preferred embodiment, the nanocomposite material has an average crystallite size ranging from 20 to 100 nm, preferably 40 to 80 nm, preferably 50 to 70 nm, preferably 55 to 65 nm, preferably 55 to 60 nm. In a preferred embodiment, the nanocomposite material has an average crystallite size of 59.07 nm.

In some embodiments, the nanocomposite material is porous. Pores may be micropores, mesopores, macropores, and/or a combination thereof. The pores exist in the bulk material, not necessarily in the molecular structure of the material. The term 'microporous' means that nanocomposite have pores with an average pore width (i.e., diameter) of less than 2 nm. The term 'mesoporous' means the pores of the nanocomposite have an average pore width of 2-50 nm. The term 'macroporous' means the pores of nanocomposite have an average pore width larger than 50 nm. Pore size may be determined by methods including, but not limited to, gas adsorption (e.g., $N_2$ adsorption), mercury intrusion porosimetry, and imaging techniques such as scanning electron microscopy (SEM), and X-ray computed tomography (XRCT).

In some embodiments, the nanocomposite material includes sheet morphologies, preferably nanosheets, although other morphologies such as nanowires, nanospheres, nanocrystals, nanorectangles, nanotriangles, nanopentagons, nanohexagons, nanoprisms, nanodisks, nanocubes, nanoribbons, nanoblocks, nanotoroids, nanodiscs, nanobarrels, nanogranules, nanowhiskers, nanoflakes, nanofoils, nanopowders, nanoboxes, nanobeads, nanobelts, nanourchins, nanoflowers, nanostars, tetrapods, and their mixtures thereof are also possible. In a preferred embodiment, nanocomposite material has a granular morphology including spherical particles. In some embodiment, the spherical particles have an average particle diameter ranging from 20 to 200 nm, preferably 50 to 130 nm, preferably 70 to 110 nm, preferably 80 to 100 nm, preferably 85 to 95 nm. In a preferred embodiment, the spherical particles of nanoparticles have an average particle diameter of 89.61 nm.

In some embodiments, the nanocomposite material has an oxygen content in a range from 40 to 90 atomic % (at. %), preferably 50 to 80 atomic % (at. %), preferably 55 to 75 atomic % (at. %), preferably 60 to 70 atomic % (at. %), preferably 65 to 70 atomic % (at. %) based on the total number of atoms in the nanocomposite. In a preferred embodiment, the nanocomposite material has an oxygen content of 64.2% based on the total number of atoms in the nanocomposite material.

In some embodiments, the nanocomposite material has a titanium content in the range of 5 to 40 at. %, preferably 10 to 30 at. %, preferably 15 to 25 at. %, preferably 17 to 24 at. %, preferably 18 to 20 at. % based on the total number of atoms in the nanocomposite material. In a preferred embodiment, the nanocomposite material has a titanium content of 21.5% based on the total number of atoms in the nanocomposite material.

In some embodiments, the nanocomposite material has a magnesium content in the range from 2.5 to 25 at. %, preferably 5 to 15 at. %, preferably 6 to 13 at. %, preferably 7 to 12 at. %, preferably 6 to 8 at. % based on the total number of atoms in the nanocomposite material. In a preferred embodiment, the nanocomposite material has a magnesium content of 9.8% based on the total number of atoms in the nanocomposite material.

In some embodiments, the nanocomposite material has a cadmium content in a range from 0.5 to 15 at. %, preferably 1 to 6 at. %, preferably 1.5 to 5 at. %, preferably 2 to 3 at. %, preferably 1 to 2 at. % based on the total number of atoms in the nanocomposite material. In a preferred embodiment, the nanocomposite material has a cadmium content of 2.6% based on the total number of atoms in the nanocomposite material.

In some embodiments, the nanocomposite material has a carbon content in a range from 0.1 to 20 at. %, preferably 0.5 to 5 at. %, preferably 1 to 4 at. %, preferably 1.5 to 3 at. %, preferably 1 to 2 at. % based on the total number of atoms in the nanocomposite material. In a preferred embodiment, the nanocomposite material has a carbon content of 1.9% based on the total number of atoms in the nanocomposite material.

In one or more embodiments, the $Mg_{0.6}Ti_{2.4}O_5$/$MgTiO_3$/tetragonal $TiO_2$/orthorhombic $TiO_2$/CdO/C nanocomposite material has 1 to 50 wt. %, preferably 10 to 40 wt. % $Mg_{0.6}Ti_{2.4}O_5$, 1 to 50 wt. %, preferably 10 to 40 wt. % $MgTiO_3$, 1 to 50 wt. %, preferably 10 to 40 wt. % tetragonal $TiO_2$, 1 to 50 wt. %, preferably 10 to 40 wt. % orthorhombic $TiO_2$, 1 to 50 wt. %, preferably 10 to 40 wt. % CdO, and 0.1 to 20 wt. %, preferably 0.5 to 10 wt. % C, based on the total weight of the $Mg_{0.6}Ti_{2.4}O_5$/$MgTiO_3$/tetragonal $TiO_2$/orthorhombic $TiO_2$/CdO/C nanocomposite material.

FIG. 1A illustrates a schematic flow chart of a method 50 of preparing the nanocomposite material. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes adding a first solution including titanium butoxide, ethanol, and acetic acid stepwise to a second solution including $Mg(NO_3)_2 \cdot 6H_2O$ and $Cd(NO_3)_2 \cdot 4H_2O$ under stirring to form a reaction mixture. In some embodiments, other sources of titanium such as titanium chloride, titanium sulfate, titanium oxalate, titanium citrate, titanium fluoride, titanium bromide, titanium iodide, titanium acetate, titanium lactate, titanium tartrate, titanium perchlorate, titanium phosphate, titanium arsenate, titanium tungstate, titanium molybdate, titanium formate, titanium carbonate, titanium borate, titanium silicate, titanium selenate, titanium tellurate, titanium vanadate, titanium chromate, titanium ferrate, titanium manganate, titanium stannate, titanium zirconate, titanium niobate, titanium tantalate, titanium hydroxide, and/or combinations thereof, may also be used instead of titanium isobutoxide. In some embodiments, the concentration of titanium butoxide in the first solution may range from 50 to 400 ml/L, preferably 100 to 300 ml/L, preferably 150 to 300 ml/L, preferably 200 to 300 ml/L, preferably 250 to 300 ml/L. In a preferred embodiment, the concentration of titanium butoxide in the first solution is 200 ml/L.

In some embodiments, the magnesium salt may include but is not limited to magnesium chloride, magnesium sulfate, magnesium acetate, magnesium carbonate, magnesium citrate, magnesium phosphate, magnesium fluoride, magnesium bromide, magnesium iodide, magnesium oxalate, magnesium tartrate, magnesium formate, magnesium silicate, magnesium arsenate, magnesium molybdate, magnesium tungstate, magnesium chromate, magnesium permanganate, magnesium borate, magnesium selenate, magnesium tellurate, magnesium vanadate, magnesium ferrate, magnesium stannate, magnesium zirconate, magnesium hydroxide, magnesium thiocyanate, magnesium hypochlorite, and magnesium thiophosphate. In a preferred embodiment, magnesium salt is $Mg(NO_3)_2 \cdot 6H_2O$. In some embodiment, the concentration of $Mg(NO_3)_2 \cdot 6H_2O$. in the second solution may range from 50 to 150 g/L, preferably 80 to 100 g/L, preferably 82 to 100 g/L, preferably 85 to 100 g/L, preferably 90 to 100 g/L, preferably 92 to 100 g/L, preferably 95 to 100 g/L. In a preferred embodiment, the concentration of $Mg(NO_3)_2 \cdot 6H_2O$. in the second solution is 93 g/L.

In some embodiments, the cadmium salt may include but is not limited to cadmium chloride, cadmium sulfate, cadmium acetate, cadmium carbonate, cadmium phosphate, cadmium fluoride, cadmium bromide, cadmium iodide, cadmium oxalate, cadmium citrate, cadmium formate, cadmium lactate, cadmium tartrate, cadmium arsenate, cadmium molybdate, cadmium tungstate, cadmium chromate, cadmium permanganate, cadmium borate, cadmium selenate, cadmium tellurate, cadmium vanadate, cadmium ferrate, cadmium manganate, cadmium stannate, cadmium zirconate, cadmium hydroxide, cadmium thiocyanate, and cadmium thiophosphate. In a preferred embodiment, cadmium salt is $Cd(NO_3)_2 \cdot 4H_2O$. In some embodiments, the concentration of $Cd(NO_3)_2 \cdot 4H_2O$ in the second solution may range from 50 to 150 g/L, preferably 100 to 125 g/L, preferably 105 to 125 g/L, preferably 110 to 125 g/L, preferably 115 to 125 g/L, preferably 120 to 125 g/L. In a preferred embodiment, the concentration of $Cd(NO_3)_2 \cdot 4H_2O$ in the second solution is 112 g/L.

In some embodiments, the concentration of ethanol in the first solution may range from 50 to 400 ml/L, preferably 100 to 300 ml/L, preferably 150 to 300 ml/L, preferably 200 to 300 ml/L, preferably 250 to 300 ml/L. In a preferred embodiment, the concentration of ethanol in the first solution is 200 ml/L.

At step 54, the method 50 includes adding a third solution including L-sorbose stepwise to the reaction mixture under stirring at 200° C. In some embodiments, other sugar sources, such as glucose, frustose, mannose, ribose, xylose, arabinose, rhamnose, allose, altrose, gulose, idose, talose, psicose, tagatose, sorbopyranose, sorbofuranose, lactose, maltose, sucrose, trehalose, raffinose, melezitose, cellobiose, fucose, deoxyribose, glucuronic acid, gluconic acid, xylohexose, ribopyranose, arabinopyranose, mannopyranose, and/or combinations thereof may also be used. In a preferred embodiment, L-sorbose is galactose. In some embodiments, the concentration of galactose may range from 25 to 120 g/L, preferably 50 to 70 g/L, preferably 55 to 70 g/L, preferably 60 to 70 g/L, preferably 65 to 70 g/L. In a preferred embodiment, the concentration of L-sorbose is 60 g/L.

At step 56, the method 50 includes stirring the reaction mixture at 100 to 300° C., preferably 200° C. until a solid is formed.

At step 58, the method 50 includes calcining the solid at a temperature in a range from 600 to 800° C. for 1 to 5 hours to yield the $Mg_{0.6}Ti_{2.4}O_5$/$MgTiO_3$/tetragonal $TiO_2$/orthorhombic $TiO_2$/CdO/C nanocomposite material. In some embodiments, the solid is calcined at a temperature in a range from 650 to 750° C., preferably 670 to 750° C., preferably 700 to 750° C., preferably 725 to 750° C. In a preferred embodiment, the solid is calcined at 700° C. In some embodiments, the solid is calcined for 2 to 4 hours, preferably 2.5 to 4 hours, preferably 3 to 4 hours, preferably 3.5 to 4 hours, preferably 3.75 to 4 hours. In a preferred embodiment, the solid is calcined for 3 hours.

EXAMPLES

The following examples demonstrate a nanocomposite material synthesized using a sol-gel combustion method. The examples are provided solely for illustration and are not to be construed as limitations of the present disclosure, as many variations thereof are possible without departing from the spirit and scope of the present disclosure.

Figure 1B:
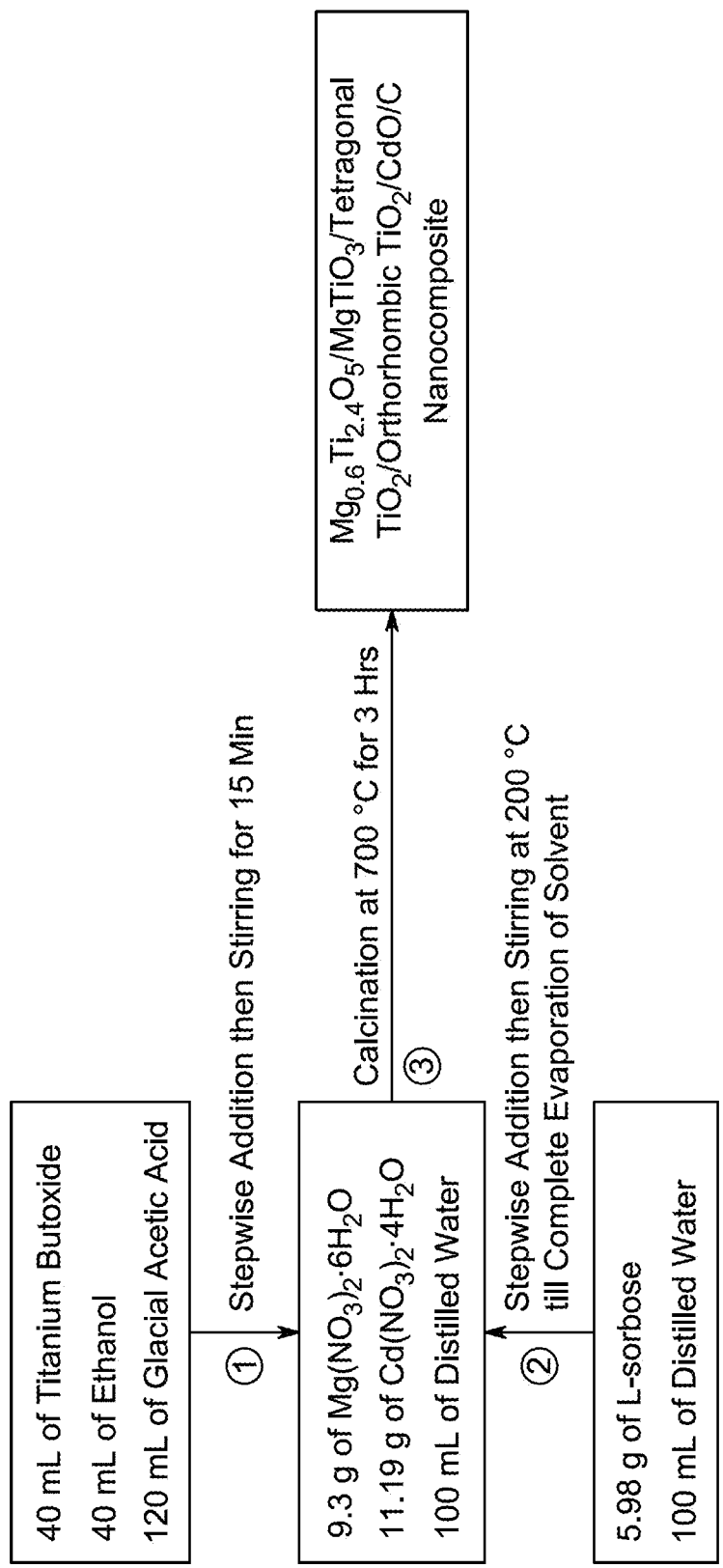
FIG. 1B illustrates an exemplary block diagram for producing the $Mg_{0.6}Ti_{2.4}O_5/MgTiO_3$/tetragonal $TiO_2$/orthorhombic $TiO_2$/CdO/C nanocomposite, according to certain embodiments.

Example 1: Synthesis of $Mg_{0.6}Ti_{2.4}O_5$/$MgTiO_3$/tetragonal $TiO_2$/orthorhombic $TiO_2$/CdO/C nanocomposite According to the present disclosure, the $Mg_{0.6}Ti_{2.4}O_5$/$MgTiO_3$/tetragonal $TiO_2$/orthorhombic $TiO_2$/CdO/C nanocomposite was synthesized using sol-gel/combustion method, as shown in FIG. 1. The synthesis was carried out by dissolving 40 milliliters (mL) of titanium butoxide ($TiOBu_4$) in a mixture of 40 milliliters (mL) ethanol ($CH_3CH_2OH$) and 120 mL glacial acetic acid ($CH_3CO_2H$). Further, a solution including 9.3 grams (g) of magnesium nitrate hexahydrate ($Mg(NO_3)_2 \cdot 6H_2O$) and 11.19 g of cadmium nitrate tetrahydrate ($Cd(NO_3)_2 \cdot 4H_2O$) was prepared in 100 mL of distilled water and gradually added to the titanium solution under continuous stirring for 15 minutes. Furthermore, 5.98 g of L-sorbose was dissolved in 100 mL of distilled water and added gradually to the resultant mixture while stirring at 200° C. until the solvent completely evaporated. The resultant powder was dried and calcined at 700° C. for 3 hours to obtain the $Mg_{0.6}Ti_{2.4}O_5$/$MgTiO_3$/tetragonal $TiO_2$/orthorhombic $TiO_2$/CdO/C nanocomposite.

Figure 2:
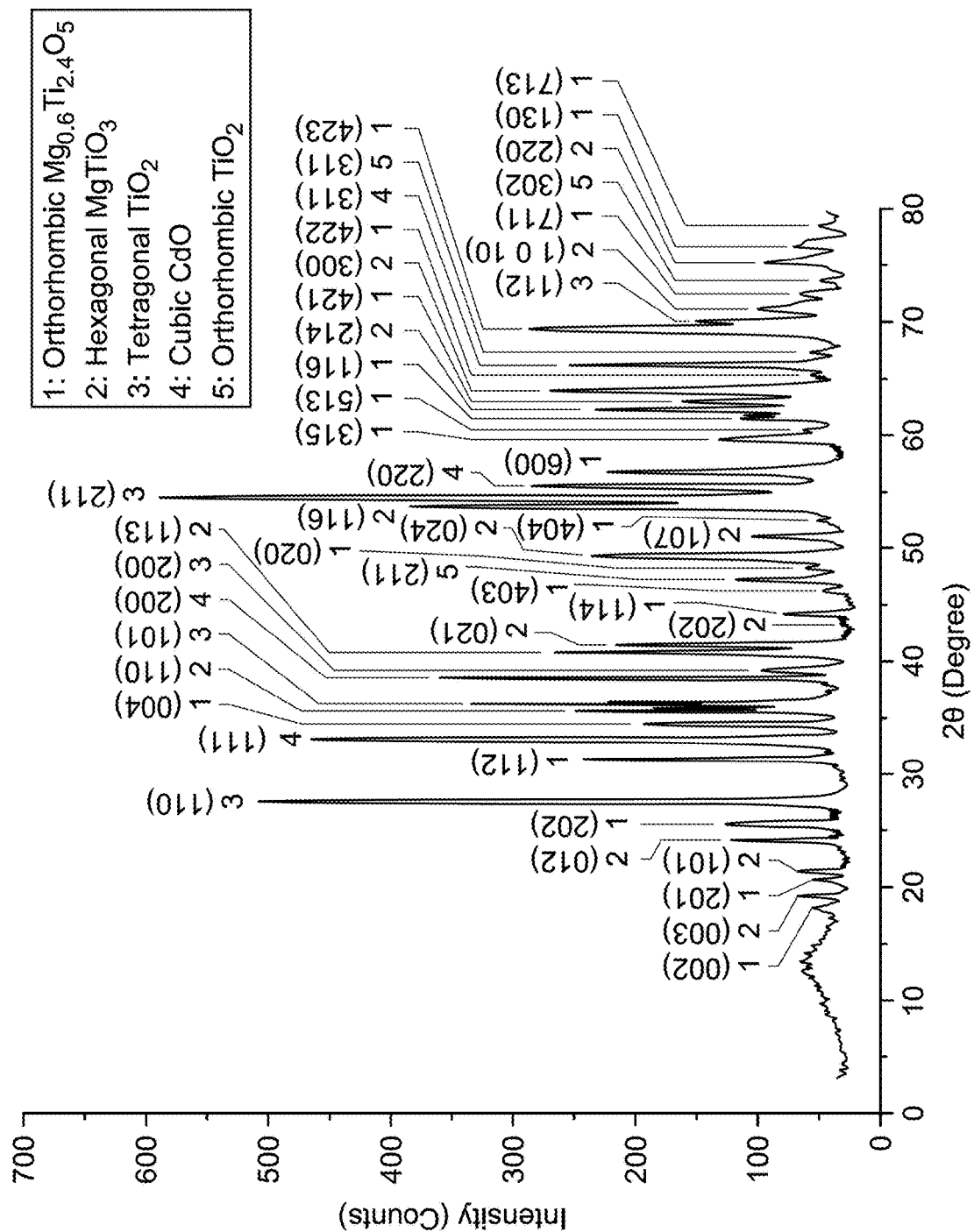
FIG. 2 is a graph depicting X-ray diffraction (XRD) pattern of the synthesized nanocomposite, according to certain embodiments.

X-ray diffraction (XRD) pattern of the synthesized nanocomposite is shown in FIG. 2. The XRD pattern revealed distinct peaks corresponding to the structural and crystallographic properties of the nanocomposite, as listed in Table 1. The synthesized nanocomposite includes phases of orthorhombic magnesium titanate ($Mg_{0.6}Ti_{2.4}O_5$) identified with card number JCPDS (No. 01-082-1128), hexagonal magnesium titanate ($MgTiO_3$) identified using database of COD-9011261, tetragonal titanium oxide ($TiO_2$) identified using card number JCPDS (No. 01-021-1276), cubic cadmium oxide (CdO) identified using card number JCPDS (No. 03-065-2908), and orthorhombic titanium oxide ($TiO_2$) identified using JCPDS (No. 01-072-0021). The orthorhombic $Mg_{0.6}Ti_{2.4}O_5$ exhibited diffraction peaks at 2θ° values of 17.93°, 20.45°, 25.39°, 31.26°, 34.31°, 44.07°, 46.17°, 48.15°, 52.26°, 56.65°, 59.59°, 60.23°, 61.38°, 62.75°, 65.06°, 69.15°, 72.30°, 76.59°, and 78.38°, corresponding to the Miller indices (002), (201), (202), (112), (004), (114), (403), (020), (404), (600), (315), (513), (116), (421), (422), (423), (711), (130), and (713), respectively. The hexagonal $MgTiO_3$ showed peaks at 2θ° values of 19.09°, 21.19°, 24.02°, 35.46°, 40.71°, 41.33°, 43.34°, 48.99°, 50.89°, 53.61°, 62.02°, 63.80°, 71.03°, and 75.13°, corresponding to the Miller indices (003), (101), (012), (110), (113), (021), (202), 5 (024), (107), (116), (214), (300), (1 0 10), and (220), respectively. The tetragonal $TiO_2$ phase revealed peaks at 2θ° values of 27.49°, 36.09°, 39.03°, 54.35°, and 69.77°, corresponding to the Miller indices (110), (101), (200), (211), and (112). The cubic CdO exhibited peaks at 2θ° values of 32.83°, 38.30°, 55.30°, and 65.99°, corresponding to Miller indices (111), (200), (220), and (311). The orthorhombic $TiO_2$ has peaks at 47.11°, 67.16°, and 73.45°, with Miller indices (211), (311), and (302), respectively. The synthesized nanocomposite was characterized by an average crystallite size of 59.07 nm, indicating nanoscale dimensions suitable for nanocomposite intended applications.

TABLE 1

Structural and crystallographic properties of the synthesized nanocomposite components, as determined by XRD.

| Phase | Chemical name | Card No. | Crystal system | Average crystallite size of synthesized nanocomposite (nm) |
|---|---|---|---|---|
| $Mg_{0.6}Ti_{2.4}O_5$ | Magnesium titanate | JCPDS-01-082-1128 | Orthorhombic | 59.07 |
| $MgTiO_3$ | Magnesium titanate | COD-9011261 | Hexagonal | |
| $TiO_2$ | Titanium oxide | JCPDS-00-021-1276 | Tetragonal | |
| CdO | Cadmium oxide | JCPDS-03-065-2908 | Cubic | |
| $TiO_2$ | Titanium oxide | JCPDS-01-072-0021 | Orthorhombic | |

Figure 3:
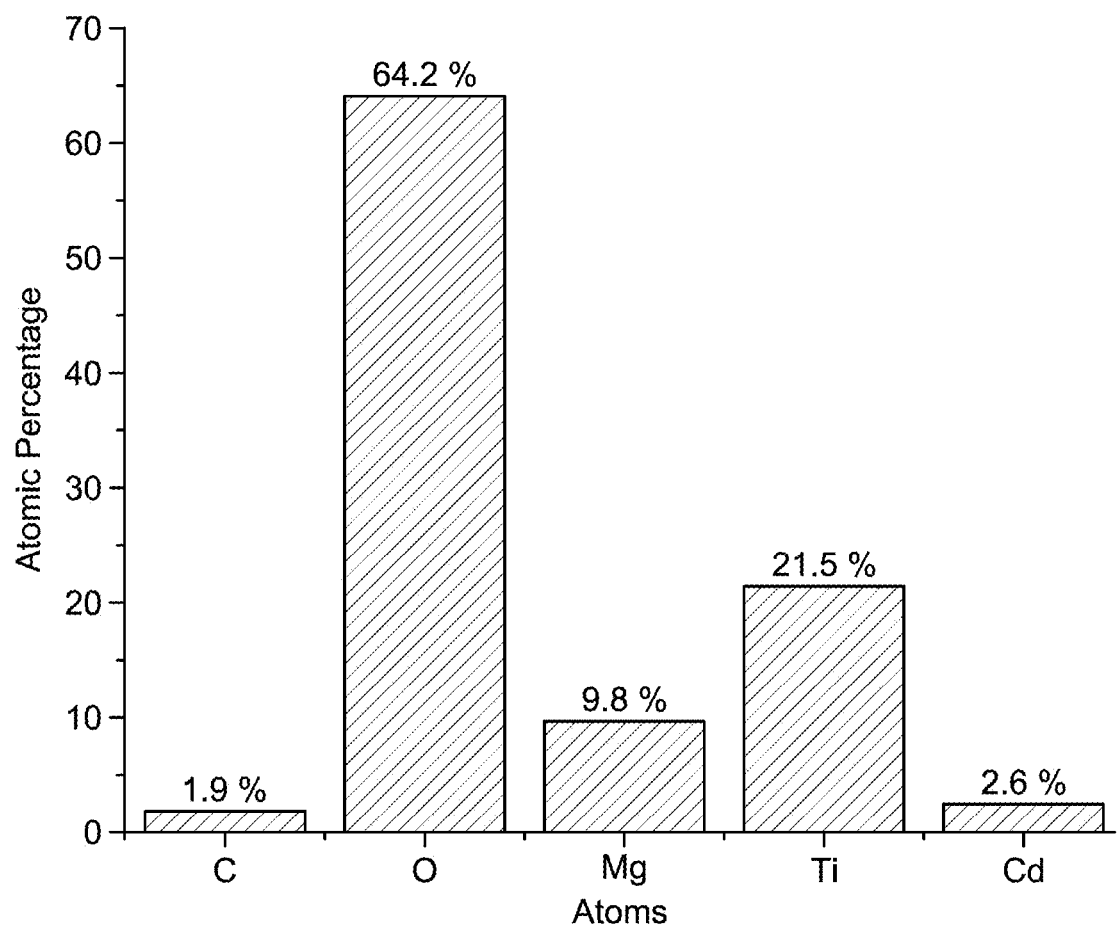
FIG. 3 is a graph depicting a distribution of atomic percentages of elements present in the synthesized nanocomposite, as determined by energy dispersive X-ray spectroscopy (EDX), according to certain embodiments.

Further, FIG. 3 illustrates the distribution of atomic percentages of elements in the synthesized nanocomposite as determined by energy dispersive X-ray spectroscopy (EDX). The elemental composition revealed the dominance of oxygen (O) at 64.2 atomic percent (at. %), followed by titanium (Ti) at 21.5 at. %, magnesium (Mg) at 9.8 at. %, cadmium (Cd) at 2.6 at. %, and carbon (C) at 1.9 at. %. The presence of carbon was attributed to the use of L-sorbose as a fuel during the sol-gel/combustion synthesis method. L-sorbose decomposes under high-temperature combustion, leaving trace amounts of carbon as a residual element in the final product. The aforementioned composition confirmed the successful incorporation of the intended elements into the nanocomposite structure, confirming the synthesis and purity of nanocomposite.

Figure 4:
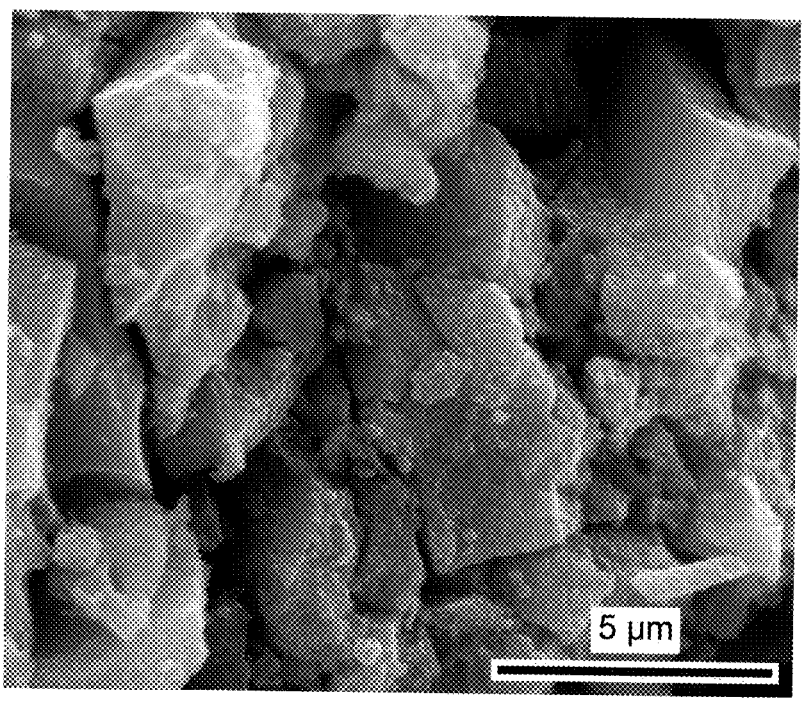
FIG. 4 is a scanning electron microscope (SEM) image of the synthesized nanocomposite, at a magnification of 5 micrometer (μm), according to certain embodiments.

FIG. 4 shows the scanning electron microscope (SEM) image of the synthesized nanocomposite, revealing the morphological characteristics of the synthesized material. The SEM image depicted a heterogeneous structure composed of irregularly shaped particles with block-like and sheet-like morphologies. The block-like structures had well-defined edges and corners, while the sheet-like structures displayed layered, plate-like appearances. These features confirmed the successful synthesis of the nanocomposite with a mixed morphology.

Figure 5:
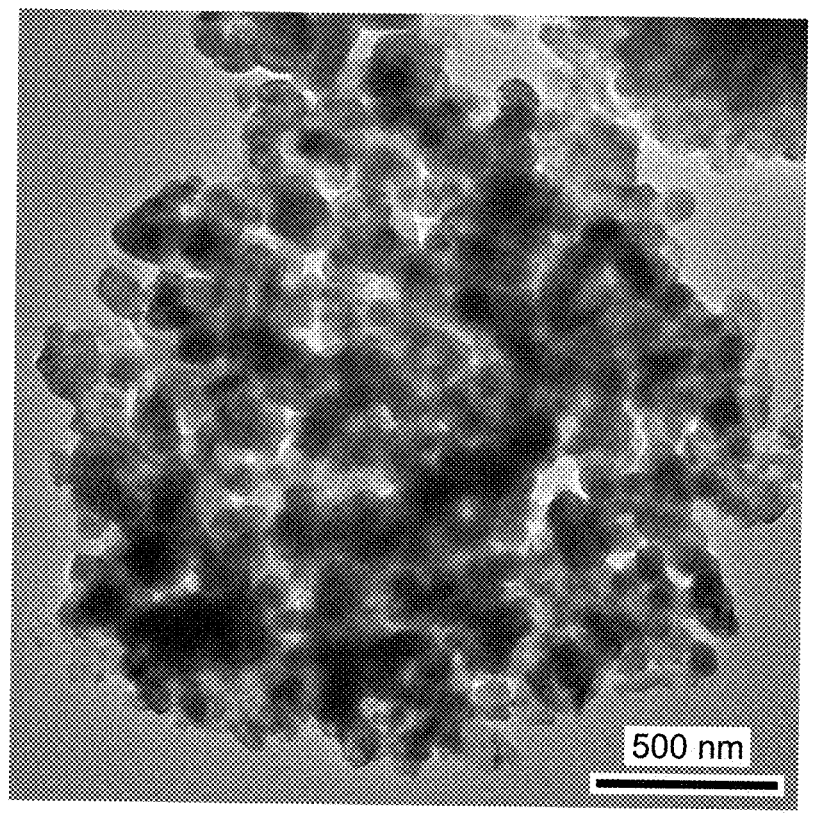
FIG. 5 is a high-resolution transmission electron microscope (HRTEM) image of the synthesized nanocomposite, at a magnification of 500 nanometer (nm), according to certain embodiments.

FIG. 5 shows the high-resolution transmission electron microscope (HR-TEM) image of the synthesized nanocomposite, highlighting nanoscale morphology and structural features. The image revealed a cluster of nearly spherical particles with a uniform distribution and slight agglomeration, reflecting the nanoscale nature of the synthesized material. The average particle diameter of the nanocomposite measured was 89.61 nm, confirming the formation of nanoparticles with consistent size and shape.

The aspects of the present disclosure provide the nanocomposite and the method of production thereof. In particular, the disclosed $Mg_{0.6}Ti_{2.4}O_5$/$MgTiO_3$/tetragonal $TiO_2$/orthorhombic $TiO_2$/CdO/C nanocomposite addresses limitations in existing technologies related to multifunctional nanocomposites. The produced nanocomposite overcame certain technological gaps in existing art by employing a sol-gel/combustion method that facilitated the controlled synthesis of a nanocomposite with a well-defined multi-phase composition, nanoscale particle size, and a combination of orthorhombic, hexagonal, tetragonal, and cubic phases. The incorporation of carbon derived from the decomposition of L-sorbose during combustion further contributed to the structural integrity and functional versatility of the material. By overcoming the challenges of phase instability, morphological inconsistencies, and low synthesis efficiency, the nanocomposite may provide an effective solution to a recognized gap in advanced material development. Further, XRD analysis revealed a multi-phase composition with orthorhombic, hexagonal, tetragonal, and cubic crystal systems, indicating a high degree of crystallinity with an average crystallite size of 59.07 nm. SEM images showed a mixed morphology of block-like and sheet-like structures, highlighting the heterogeneity and enhanced surface area of the nanocomposite. Furthermore, EDX confirmed the elemental composition, showing oxygen at 64.2%, titanium at 21.5%, magnesium at 9.8%, cadmium at 2.6%, and carbon at 1.9%, with the presence of carbon attributed to the decomposition of L-sorbose during combustion. HR-TEM further validated the nanoscale features, showing nearly spherical particles with a uniform distribution and an average particle diameter of 89.61 nm.

The synthesized $Mg_{0.6}Ti_{2.4}O_5$/$MgTiO_3$/tetragonal $TiO_2$/orthorhombic $TiO_2$/CdO/C nanocomposite may be used in advanced water treatment applications by efficiently removing heavy metals and organic pollutants from contaminated water. The multi-phase structure and improved conductivity of the nanocomposite may be suitable for energy storage devices, including supercapacitors and batteries. Furthermore, the distinctive photocatalytic and optical properties of the nanocomposite may be applicable in environmental remediation and photovoltaic technologies.

Numerous modifications and variations of the present disclosure are possible in light of the above teachings. It is, therefore, to be understood that within the scope of the appended claims, the disclosure may be practiced otherwise than as specifically described herein.

The invention claimed is:

1. A $Mg_{0.6}Ti_{2.4}O_5$/$MgTiO_3$/tetragonal $TiO_2$/orthorhombic $TiO_2$/CdO/C nanocomposite material, comprising:
   an orthorhombic $Mg_{0.6}Ti_{2.4}O_5$ phase;
   a hexagonal $MgTiO_3$ phase;
   a tetragonal $TiO_2$ phase;
   a cubic CdO phase; and
   an orthorhombic $TiO_2$ phase,
   wherein the $Mg_{0.6}Ti_{2.4}O_5$/$MgTiO_3$/tetragonal $TiO_2$/orthorhombic $TiO_2$/CdO/C nanocomposite material has a granular morphology comprising spherical particles having an average particle diameter in a range from 50 to 130 nm.

2. The $Mg_{0.6}Ti_{2.4}O_5$/$MgTiO_3$/tetragonal $TiO_2$/orthorhombic $TiO_2$/CdO/C nanocomposite material of claim 1, wherein the spherical particles have an average particle diameter in a range from 70 to 110 nm.

3. The $Mg_{0.6}Ti_{2.4}O_5$/$MgTiO_3$/tetragonal $TiO_2$/orthorhombic $TiO_2$/CdO/C nanocomposite material of claim 2, wherein the spherical particles have an average particle diameter in a range from 80 to 100 nm.

4. The $Mg_{0.6}Ti_{2.4}O_5$/$MgTiO_3$/tetragonal $TiO_2$/orthorhombic $TiO_2$/CdO/C nanocomposite material of claim 1, wherein the $Mg_{0.6}Ti_{2.4}O_5$/$MgTiO_3$/tetragonal $TiO_2$/orthorhombic $TiO_2$/CdO/C nanocomposite material has an oxygen content in a range from 50 to 80 atomic % (at. %), a titanium content in a range from 10 to 30 at. %, a magnesium content in a range from 5 to 15 at. %, a cadmium content in a range from 1 to 6 at. %, and a carbon content in a range from 0.5 to 5 at. % based on a total number of atoms in the $Mg_{0.6}Ti_{2.4}O_5$/$MgTiO_3$/Tetragonal $TiO_2$/Orthorhombic $TiO_2$/CdO/C nanocomposite material.

5. The $Mg_{0.6}Ti_{2.4}O_5$/$MgTiO_3$/tetragonal $TiO_2$/orthorhombic $TiO_2$/CdO/C nanocomposite material of claim 4, wherein the $Mg_{0.6}Ti_{2.4}O_5$/$MgTiO_3$/tetragonal $TiO_2$/orthorhombic $TiO_2$/CdO/C nanocomposite material has an oxygen content in a range from 55 to 75 atomic % (at. %), a titanium content in a range from 15 to 25 at. %, a magnesium content in a range from 6 to 13 at. %, a cadmium content in a range from 1.5 to 5 at. %, and a carbon content in a range from 1 to 4 at. % based on a total number of atoms in the $Mg_{0.6}Ti_{2.4}O_5$/$MgTiO_3$/Tetragonal $TiO_2$/Orthorhombic $TiO_2$/CdO/C nanocomposite material.

6. The $Mg_{0.6}Ti_{2.4}O_5$/$MgTiO_3$/tetragonal $TiO_2$/orthorhombic $TiO_2$/CdO/C nanocomposite material of claim 5, wherein the $Mg_{0.6}Ti_{2.4}O_5$/$MgTiO_3$/tetragonal $TiO_2$/orthorhombic $TiO_2$/CdO/C nanocomposite material has an oxygen content in a range from 60 to 70 atomic % (at. %), a titanium content in a range from 17 to 24 at. %, a magnesium content in a range from 7 to 12 at. %, a cadmium content in a range from 2 to 3 at. %, and a carbon content in a range from 1.5 to 3 at. % based on a total number of atoms in the $Mg_{0.6}Ti_{2.4}O_5$/$MgTiO_3$/Tetragonal $TiO_2$/Orthorhombic $TiO_2$/CdO/C nanocomposite material.

7. The $Mg_{0.6}Ti_{2.4}O_5$/$MgTiO_3$/tetragonal $TiO_2$/orthorhombic $TiO_2$/CdO/C nanocomposite material of claim 1, wherein the $Mg_{0.6}Ti_{2.4}O_5$/$MgTiO_3$/tetragonal $TiO_2$/orthorhombic $TiO_2$/CdO/C has an average crystallite size in a range from 40 to 80 nm.

8. The $Mg_{0.6}Ti_{2.4}O_5$/$MgTiO_3$/tetragonal $TiO_2$/orthorhombic $TiO_2$/CdO/C nanocomposite material of claim 7, wherein the $Mg_{0.6}Ti_{2.4}O_5$/$MgTiO_3$/tetragonal $TiO_2$/orthorhombic $TiO_2$/CdO/C has an average crystallite size in a range from 50 to 70 nm.

9. The $Mg_{0.6}Ti_{2.4}O_5$/$MgTiO_3$/tetragonal $TiO_2$/orthorhombic $TiO_2$/CdO/C nanocomposite material of claim 8, wherein the $Mg_{0.6}Ti_{2.4}O_5$/$MgTiO_3$/tetragonal $TiO_2$/orthorhombic $TiO_2$/CdO/C has an average crystallite size in a range from 55 to 65 nm.

10. A method of producing the orthorhombic $Mg_{0.6}Ti_{2.4}O_5$/$MgTiO_3$/tetragonal $TiO_2$/orthorhombic $TiO_2$/CdO/C nanocomposite material of claim 1, comprising:
   adding a first solution comprising titanium butoxide, ethanol, and acetic acid stepwise to a second solution comprising $Mg(NO_3)_2 \cdot 6H_2O$ and $Cd(NO_3)_2 \cdot 4H_2O$ under stirring to form a reaction mixture;
   adding a third solution comprising L-sorbose stepwise to the reaction mixture under stirring at 200° C.;
   stirring the reaction mixture at 200° C. until a solid is formed; and
   calcining the solid at a temperature in a range from 600° C. to 800° C. for 1 to 5 hr to yield the $Mg_{0.6}Ti_{2.4}O_5$/$MgTiO_3$/Tetragonal $TiO_2$/Orthorhombic $TiO_2$/CdO/C nanocomposite material.

11. The method of claim 10, wherein the concentration of titanium butoxide in the first solution is in a range from 100 to 300 ml/L.

12. The method of claim 11, wherein the concentration of titanium butoxide in the first solution is 200 ml/L.

13. The method of claim 10, wherein the concentration of ethanol in the first solution is in a range from 100 to 300 ml/L.

14. The method of claim 10, wherein the concentration of $Mg(NO_3)_2 \cdot 6H_2O$ in the second solution is in a range from 80 to 100 g/L.

15. The method of claim 10, wherein the concentration of $Cd(NO_3)_2 \cdot 4H_2O$ in the second solution is in a range from 100 to 125 g/L.

16. The method of claim 10, wherein the concentration of L-sorbose in the third solution is in a range from 50 to 70 g/L.

17. The method of claim 10, wherein the solid is calcined at a temperature in a range from 650° C. to 750° C.

18. The method of claim 17, wherein the solid is calcined at 700° C.

19. The method of claim 10, wherein the solid is calcined for 2 to 4 hours.

20. The method of claim 10, wherein the solid is calcined for 3 hours.

* * * * *